United States Patent [19]

Shinoi et al.

[11] 4,260,857
[45] Apr. 7, 1981

[54] OFFICE LINE CONNECTION CIRCUIT DURING SERVICE INTERRUPTIONS IN KEY TELEPHONE APPARATUS

[75] Inventors: Tsuyoshi Shinoi, Yokohamashi; Setsuo Oshima, Kawasaki, both of Japan

[73] Assignees: Nippon Tsushin Kogyo KK, Kawasaki, Japan; TIE/Communications, Inc., Shelton, Conn.

[21] Appl. No.: 7,898

[22] Filed: Jan. 30, 1979

[30] Foreign Application Priority Data

May 2, 1978 [JP] Japan .............................. 53-59262[U]

[51] Int. Cl.³ .......................... H04Q 5/18; H04M 1/00
[52] U.S. Cl. ............................ 179/99 R; 179/99 LC; 179/18 GE
[58] Field of Search ............................ 179/99, 18 GE

[56] References Cited

U.S. PATENT DOCUMENTS

| | | | |
|---|---|---|---|
| 3,660,611 | 5/1972 | Knollman et al. | 179/99 M |
| 4,010,331 | 3/1972 | Taylor et al. | 179/99 A |
| 4,027,110 | 5/1977 | Takematsu et al. | 179/99 M |
| 4,096,359 | 6/1978 | Barsellotti | 179/99 R |
| 4,117,274 | 9/1978 | Cannon et al. | 179/99 E |
| 4,125,749 | 11/1978 | Kinoshita et al. | 179/99 M |

*Primary Examiner*—Gerald L. Brigance
*Attorney, Agent, or Firm*—Francis N. Carten

[57] ABSTRACT

A switching matrix in the key service unit of a key telephone system is formed by several groups of relays, each group being associated with a particular station set and each relay in each group also being associated with a particular central office line. All of the relays, except one in each group, disconnect the associated station set from the associated line when the relay is de-energized. One relay in each group functions in the opposite manner to connect the associated station set to the associated line upon failure of the local power supply.

4 Claims, 1 Drawing Figure

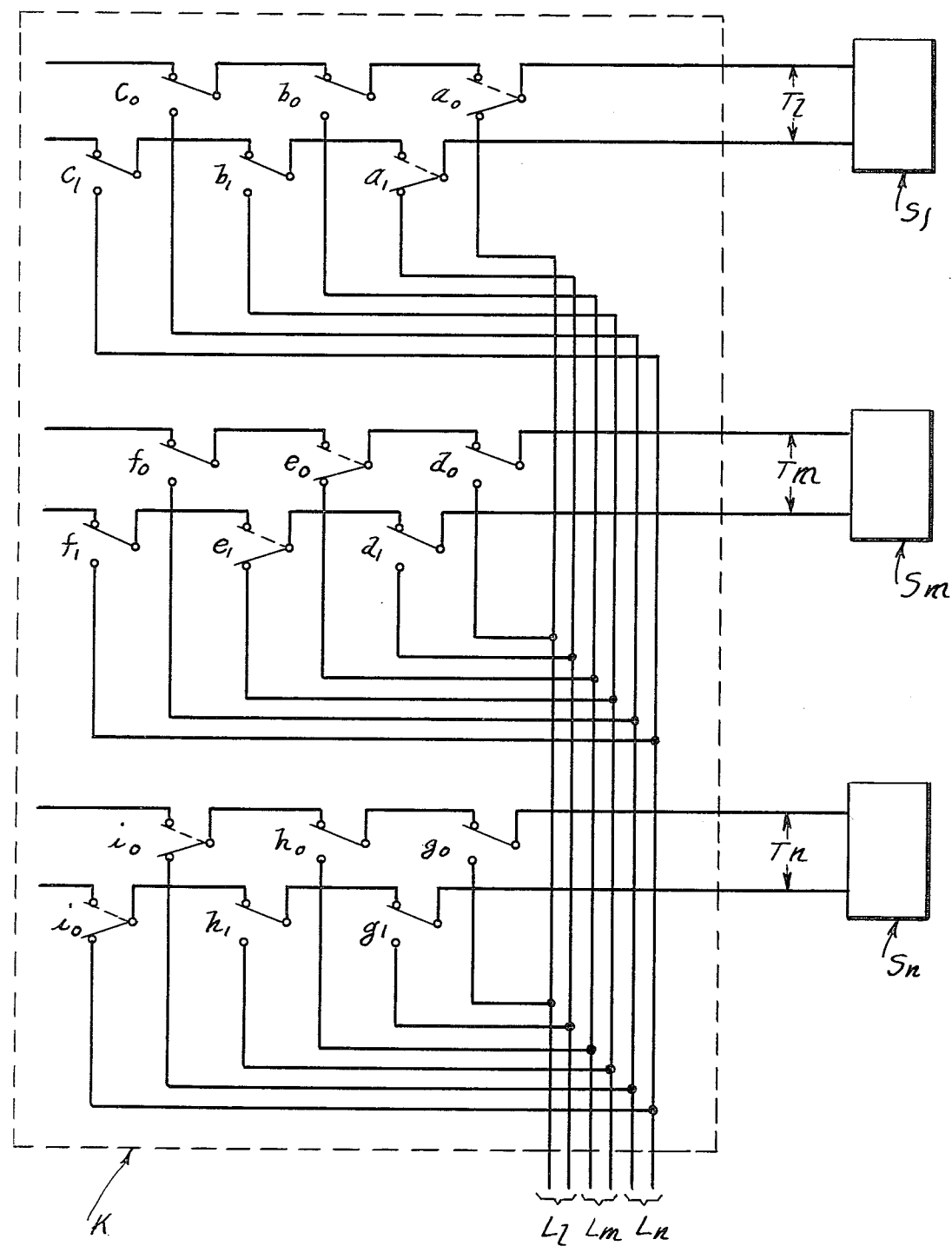

OFFICE LINE CONNECTION CIRCUIT DURING SERVICE INTERRUPTIONS IN KEY TELEPHONE APPARATUS

BACKGROUND OF THE INVENTION

The present invention is related to telephone terminal equipment. More specifically, it pertains to circuitry in the key service unit (KSU) of an electronic key telephone system for connecting each key telephone station set in the system to a central office (C.O.) line in the event of a failure of local power at the system installation site.

Known key telephone systems of conventional design have at least one pair of conductors for each line running from the key service unit to each station set, and accomplish switching of any selected line at the station set by means of a key or pushbutton associated with the line. Consequently, the number of conductor pairs increases as the number of central office lines increases, with accompanying increases in cost of materials and labor required to effect an installation. To overcome these problems, electronic key telephone systems have been designed to effect switching at the KSU instead of in the station set, using reduced-pair cable runs to establish voice signal and data signal and power transmission paths between the KSU and each station set. In such systems, the actuation of a key or pushbutton at a station set causes transmission of data from the station set to the KSU, thereby signalling the desired service, e.g., connection to a C.O. line. The KSU might employ time division or space division techniques, or both, with relays and semiconductors being employed to implement space division.

The known way of maintaining telephone service during power failures is to provide additional relays in the KSU for connecting each C.O. line to a predetermined station set. It is the object of the present invention to accomplish the function of establishing the connections of each C.O. line to a predetermined station set in a key telephone system during power failures without using additional relays in the KSU.

SUMMARY OF THE INVENTION

The present invention is embodied in and carried out by a circuit incorporated into the switching matrix of the KSU of a key telephone system, that circuit being operative to connect each C.O. line to a predetermined station set during failures in the local power supply.

BRIEF DESCRIPTION OF THE DRAWING

The present invention may be better understood by reading the written description thereof with reference to the accompanying drawing, which generally illustrates a key telephone system and particularly includes a schematic wiring diagram of the key service unit in which the present invention is incorporated.

DESCRIPTION OF THE PREFERRED EMBODIMENT

Referring to the drawing, the key service unit K establishes the connections between C.O. lines $L_1$, $L_m$ and $L_n$ and the key telephone station sets circuits $S_1$, $S_m$ and $S_n$ via the voice signal paths formed by conductor pairs $T_1$, $T_m$ and $T_n$, respectively. In the key service unit K, the relay armatures $a_0$, $a_1$ through $i_0$, $i_1$ (inclusive) are shown establishing the connections made during local power supply failures. Specifically, only relay armatures $a_0$, $a_1$ and $e_0$, $e_1$ and $i_0$, $i_1$ are closed against the associated lower contacts, while all other relay armatures are closed against the associated upper contacts. Thus, station set circuit $S_1$ is connected through armatures $a_0$, $a_1$ to C.O. line $L_1$; station set circuit $S_m$ is connected through armatures $e_0$, $e_1$ to C.O. line $L_m$; and station set circuit $S_n$ is connected through armatures $i_0$, $i_1$ to C.O. lines $L_n$. Accordingly, the station sets function as single-line sets during power failures. During normal service, the relay armatures $a_0$, $a_1$ and $e_0$, $e_1$ and $i_0$, $i_1$ are normally closed against their associated upper contacts as shown by the phantom armatures illustrated by broken lines in the drawing. Thus, the relays incorporating armatures $a_0$, $a_1$ and $e_0$, $e_1$ and $i_0$, $i_1$ are normally energized when the local power supply is functioning, and all other relays are normally de-energized. Under normal conditions, then, station set circuit $S_1$ is connected to C.O. line $L_1$ by de-energizing the relay controlling armatures $a_0$, $a_1$, but is connected to C.O. lines $L_m$ or $L_n$ by energizing the relay controlling armatures $b_0$, $b_1$, or $c_0$, $c_1$. In this manner, the connections established by separate relay circuitry in known systems is accomplished with the relays in the switching matrix of the key service unit K, thereby effecting substantial economy of system construction.

The advantages of the present invention, as well as certain changes and modifications to the disclosed embodiment thereof, will be readily apparent to those skilled in the art. For example, each of the armature pairs $a_0$, $a_1$, through $i_0$, $i_1$, (inclusive) may be ganged in a single relay, or may operate independently in separate relays. It is the applicants' intention to cover all those changes and modifications which could be made to the embodiment of the invention herein chosen for the purposes of the disclosure without departing from the spirit and scope of the invention.

We claim:

1. In a key telephone system including a key service unit having a switching matrix comprising a plurality of relay means, and a plurality of key telephone station sets which may be selectively connected to one or more lines, the improvement comprising: said plurality of relay means comprising a plurality of groups of relay means, each group being associated with a predetermined key telephone station set, each relay means in each of said groups being controlled by the associated key telephone station set, when the local power supply is functioning, to connect or disconnect the associated key telephone station set to or from the line associated with the relay means and having one of said relay means in each group operative, upon failure of the local power supply, to connect the associated key telephone station set to a predetermined line.

2. The improvement according to claim 1, wherein each of said relay means comprises first and second armatures moveable between first and second upper contacts and first and second lower contacts, respectively, said first armatures being connected in series in a first conductor from said key service unit to the associated station set when closed against said first upper contacts, said second armatures being connected in series in a second conductor from said key service unit to the associated station set when closed against said second upper contacts, and each of said first and second lower contacts being connected to first and second conductors in associated lines.

3. The improvement according to claim 2, wherein the first and second armatures of only said one of said relay means in each of said groups of relays are closed against the associated first and second lower contacts when said one of said relay means is de-energized.

4. The improvement according to claim 3, wherein each of said one of said relay means in each of said groups of relays is associated with a different line.

* * * * *